(No Model.)  3 Sheets—Sheet 1.

P. C. SOUTHWICK.
BALING PRESS.

No. 458,641. Patented Sept. 1, 1891.

Witnesses
W. C. Coolies
A. M. Best

Inventor
Plin C. Southwick
By Coburn & Thacher
Atty.

(No Model.) 3 Sheets—Sheet 2.
P. C. SOUTHWICK.
BALING PRESS.
No. 458,641. Patented Sept. 1, 1891.
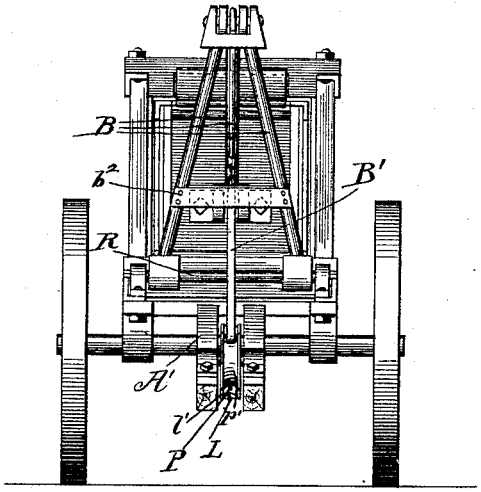
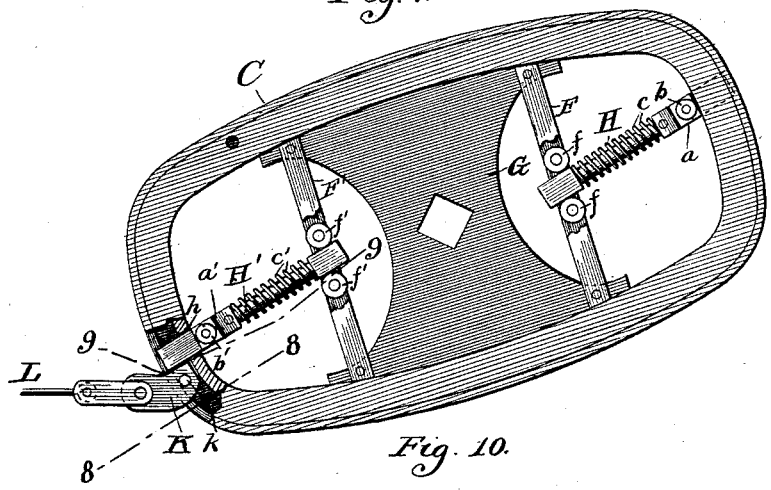
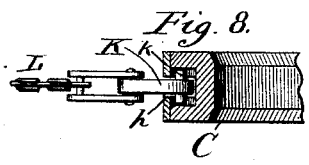
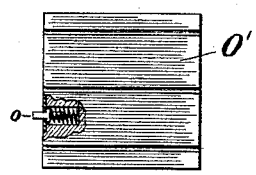
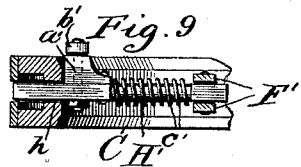
Witnesses
W. C. Coolies
A. M. Best.
Inventor
Plin C. Southwick
By Cobb & Thacher
Atty.

(No Model.) 3 Sheets—Sheet 3.
P. C. SOUTHWICK.
BALING PRESS.
No. 458,641. Patented Sept. 1, 1891.
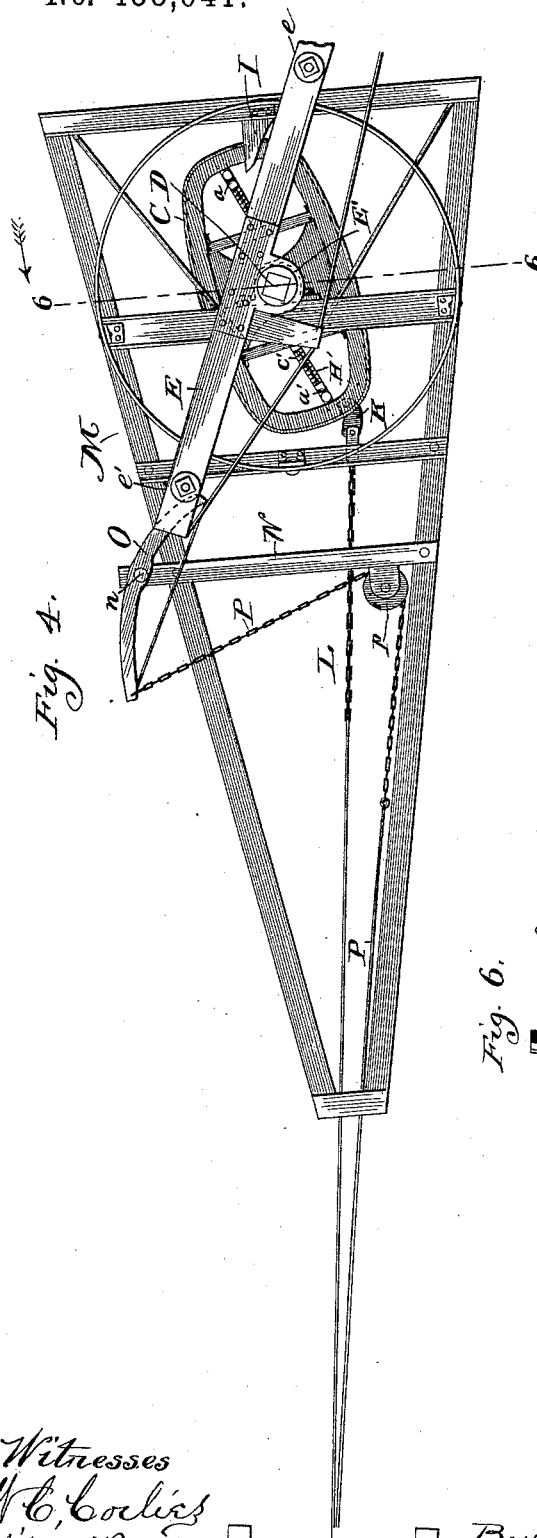
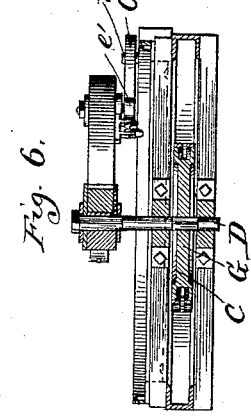
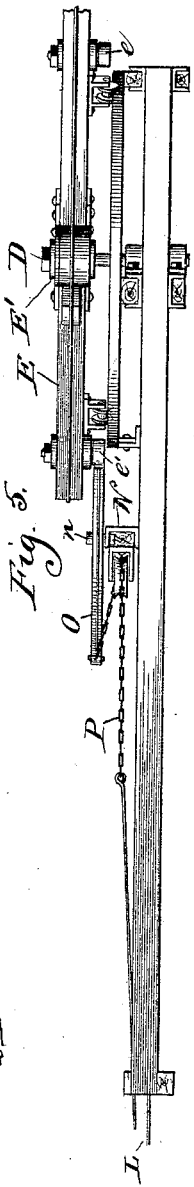
Witnesses
W. E. Coolick
A. M. Best
Inventor
Plin C. Southwick
By Coburn & Thacher
Atty.

UNITED STATES PATENT OFFICE.

PLIN C. SOUTHWICK, OF NEWARK, ILLINOIS.

BALING-PRESS.

SPECIFICATION forming part of Letters Patent No. 458,641, dated September 1, 1891.

Application filed November 19, 1890. Serial No. 371,899. (No model.)

*To all whom it may concern:*

Be it known that I, PLIN C. SOUTHWICK, a citizen of the United States, residing at Newark, in the county of Kendall and State of Illinois, have invented a certain new and useful Improvement in Baling-Presses, which is fully set forth in the following specification, reference being had to the accompanying drawings, in which—

Figure 1:
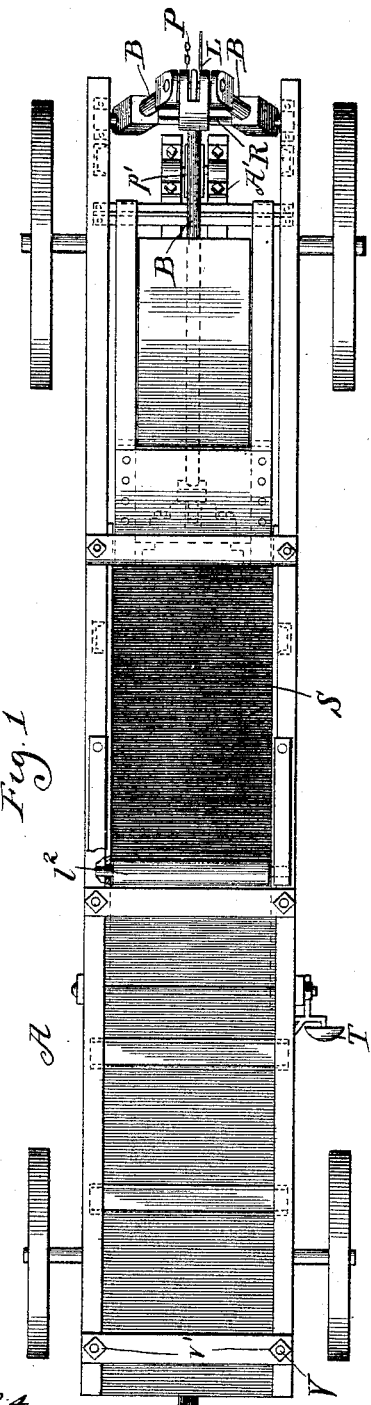
Figure 2:
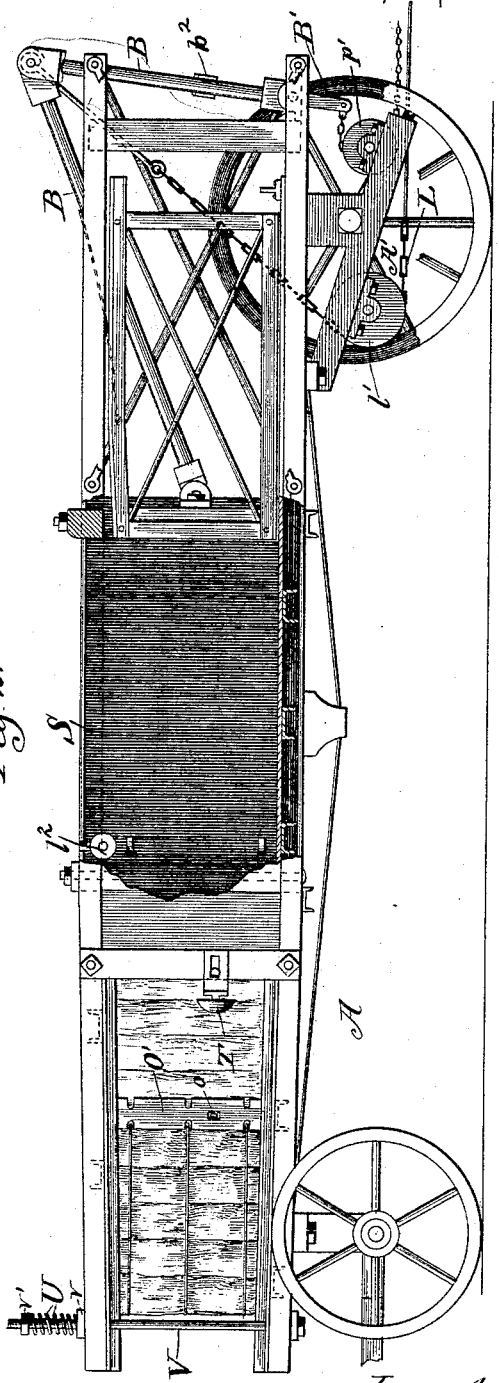

Figure 1 is a plan view of my hay-press. Fig. 2 is a side elevation of the same, partly broken away. Fig. 3 is a rear elevation of the hay-press. Fig. 4 is a plan view of the power mechanisms that operate the press. Fig. 5 is a side elevation of the same. Fig. 6 is a cross-section taken on the line 6 6 of Fig. 4, looking in the direction of the arrow. Fig. 7 is a detail plan view of the cam in the power mechanism. Fig. 8 is a detail section taken on the line 8 8 of Fig. 7. Fig. 9 is a detail section taken on the line 9 9 of Fig. 7. Fig. 10 is an elevation of one of the followers which is used in the press, and Fig. 11 is a plan view of the bell and a part of one of the followers which operates the same.

My improvement relates chiefly to mechanisms used in connection with the power that actuates or operates the press proper; and it consists in the devices hereinafter described.

A is the press proper, having at the rear end, as shown in Figs. 2 and 3, a toggle B B', of the usual form, connected with the power operating the press proper in the manner hereinafter described.

C is a cam secured to the upright shaft D, to which the sweep E is attached by means of the hub E'. The cam C is of metal and is oblong in its shape, as shown in Figs. 4 and 7, and is provided with a groove in its periphery. Across the center of the cam, as shown in Fig. 7, are two bars F and F', which are composed of two thin pieces of iron or other metal riveted to the rib G in the cam C. These two pieces of metal, forming the bars F and F', are separated by the width of the rib G only. In the inside of each one of these bars and between the strips are secured rollers $ff$ and $f'f'$, journaled in each one of the said strips forming the bar and of sufficient distance from each other to admit of the spring-catches H H', moving in frictional contact with both of said rollers on each bar.

The spring-catches H H' are of metal, preferably of steel, and are placed loosely, so as to move freely between the strips forming each of the bars F and F', and between the rollers $ff$ and $f'f'$, so as to move freely between the rollers and the pieces composing the bar. At the other end the spring-catches are inserted in openings $h$ in the inside of the cam C. These openings extend through to the groove in the periphery of the cam in such a manner as to allow the spring-catches to move freely in and out of said openings, as hereinafter stated.

Adjacent to the inside of the cam and on the spring-catches H H' are blocks $aa'$, bolted to the spring-catches, as shown in Fig. 9. On these blocks are friction-rollers $bb'$, which have a bearing in the blocks. The ends of these spring-catches H H' are square or rectangular. The center is preferably made cylindrical, and a coil-spring $cc'$ is placed upon the spring-catches H H', between the block $a$ and the end of the catch, entering bars F F'. These coil-springs are large enough to prevent their passage through the bars F F', which bars form a stop to the spring at this end and for the purposes hereinafter specified.

Within the groove of the cam C is a clutch K. The clutch K moves freely within this groove and is secured therein by a pin $k$, as shown in Fig. 8. This pin also moves freely in the groove and with the clutch.

To the clutch K is pivoted the chain L, having a long link in the center. The chain L connects the clutch K with the elbow of the toggle B B' in the baling-press for the purpose of straightening said toggle whenever the hay is to be compressed.

I is a cam secured to the frame of the power M, and is of such shape and secured in such a position on the frame that whenever the press is in operation and the cam C moves around to the point where the cam I is placed the cam I will strike the roller $b$ or $b'$, withdrawing the spring-catches from the groove in cam C and out of contact with the clutch K, thereby releasing the clutch K with the chain L attached to it, thereby causing the toggle B B' to be retracted from any pressure on the hay and allowing it to be folded again by the means hereinafter stated. The pin $k$ is inserted in the groove of the cam C to hold the clutch K in the groove of the cam, as shown in Fig. 8. The shaft D is secured within the frame of the power by any well-known means.

The toggle B B' is retracted from contact with the pressed hay or folded by the following means: The sweep E is attached to the upright shaft D in the same manner as cam C, and both have a continuous motion in one direction. On the cross-piece N of the frame M is mounted a bent cam-lever O, pivoted to the cross-piece N at $n$. P is a chain connecting the outer end of the lever O with a depending arm B' of the toggle B B', said chain being pivoted to the lower end of said depending arm. The depending arm or lever B' is secured at its upper end to a cross-bar $b^2$, connecting the short arms of the toggle B B'. R is a bar passing through the lever B' at or near its center, and is suitably journaled in the frame of the baling-press. This bar R is the fulcrum of the depending lever B'. The short arms of toggle B B' are also hinged or pivoted to the bar R. In connecting chain P with the depending lever B' the chain passes under a pulley $p$, which has its bearing in a lug projecting from the cross-piece N, and said chain is carried to the press and there also passes under the sheave-pulley $p'$, which has its bearing in suitable blocks or pieces A', secured under the main frame of the press. The pieces or blocks A' also afford a bearing for the sheave-pulley $l'$, under which the chain L passes in forming its connection with the elbow of the toggle and the clutch K.

On the inside of the sweep E are suitable friction-rollers $e\ e'$, so placed on the sweep and at such a distance from the shaft D that said friction-rollers will strike the free end of the lever O at a suitable distance from its end, and remain in frictional contact with the lever, depressing its free end, and of course elevating the end to which the chain P is attached, the friction-rollers $e\ e'$ remaining alternately in contact with the lever O until the chain P retracts the long arm of the toggle B B', with its head at a sufficient distance to enable the workmen to place within said press a sufficient quantity of hay to be again compressed by the action of the toggle. When either of the friction-rollers $e\ e'$ passes out of contact with the free end of the lever O, the retraction of the arm of the toggle ceases, and the lever O, by the operation hereinbefore stated, commences to straighten the toggle, and of course the compression of the hay at once begins, the operation of the lever O and the cam C being alternate.

At the end of the long arm of the toggle B B' is a suitable head with a supporting-frame of the ordinary construction, as shown in Fig. 2, this head being pressed forward or retracted with the arm of the toggle, and of course coming in contact with the hay to be pressed. Now after the toggle with its head is retracted as shown in Fig. 2, a follower, as shown in Fig. 10, is inserted in the forward end of the opening in the press, where the hay to be pressed is inserted. This follower O' is of the usual construction, except that it has on its side a spring-bolt $o$, which projects slightly beyond the side of the follower when in its normal position. An ordinary coil-spring is inserted in the follower and encircles the shank of the bolt, the upper part of the bolt resting on this coil-spring, as shown in Fig. 10.

T is a bell constructed like an ordinary call-bell. It is secured by any suitable means on the cross-piece at the end of the closed part of the press, or that part which is closed on every side. Whenever the follower is pressed by the hay beyond the closed part of the press at the side, the spring bolt $o$ projects beyond the side of the follower and strikes the bell, thereby notifying the attendant that it is time to place another follower at the front end of the opening in the hay-press. Hay is then placed in the press, the power is set in motion, and the cam C, being in a position shown in Fig. 4, commences revolving with the shaft D, and carries with it the clutch K with the chain L attached, the clutch K being held by the catch H', which revolves with the cam. When the clutch with the catch reaches the cam I in the frame of the machine, as before stated, the cam I operates to withdraw the spring-catch H' from its connection with the clutch, and the clutch is immediately withdrawn from its position at I back again to the position shown in Fig. 4 and the toggle B B' with the frame is retracted from the hay by the operation of the lever P, as before described. As soon as this is retracted the spring-catch H engages with the clutch K and the compressing operation is repeated. With each revolution of the sweep the hay is compressed twice by the operation hereinbefore stated, and by the same operation two retractions or foldings of the toggle B B' are accomplished. In the interval, after the retraction and before compression, the opening S is filled with hay, the filling of the opening being continued until sufficient hay is put in to form a bale, when it is wired or bound, as shown in Fig. 2, and pushed from the press and another bale is formed. The press proper is of the usual form, except the addition of a roller $l^2$ at the front of the opening, by means of which the hay is more rapidly drawn under and within the remaining part of the press to be more readily compressed. The press grows smaller at the end where the bale of hay is delivered, in the usual manner of such presses, and at the extreme end is a rod V, projecting above the press at a sufficient distance to insert a coil-spring U, which is secured on the rod between a washer $v$ on the press and a nut $v'$ at the end of the rod. This spring is of sufficient tension to hold the side or end of the press against the hay to be compressed. At the same time it will allow the follower O' to pass out at the end of the machine. A cam-lever, like the lever O, may be used in place of the pulley $p'$ for connecting the chain P to the end of the toggle B'.

Having fully described my invention, what I claim as new, and desire to secure by Letters Patent, is—

In combination with the toggle of the baling-press, a horse-power operatively connected to the said toggle by means of chains and pulleys to advance and retract the plunger of the press, the horse-power having a sweep E, mounted on the post D, and carrying two anti-friction rollers at equal distances from said post D, the pivoted lever O, one end of which is attached to the chain that retracts the plunger, the other end extending across the path of said rollers in such manner as to be depressed, the revolving cam C, provided with an annular T-shaped groove in its periphery and carrying the clutch K, attached to the chain that advances the plunger, two spring-catches H H', attached to the cam C opposite to each other, and a stationary cam I, operating said catches, whereby the plunger is caused to make two full strokes at each revolution of the sweep by said mechanisms, as shown and described.

PLIN C. SOUTHWICK.

Witnesses:
N. V. BARNARD, Jr.,
GEO. H. NICHOLS.